Patented July 28, 1942

2,291,166

UNITED STATES PATENT OFFICE 2,291,166

LUBRICANT

Oscar L. Maag, Canton, Ohio, assignor to The Lubri-Zol Development Corporation, Cleveland, Ohio, a corporation of Delaware No Drawing. Application January 7, 1939, Serial No. 249,763

9 Claims. (Cl. 252—58)

This invention relates, as indicated, to lubricants and more particularly to lubricating compositions designed to be employed under difficult operating conditions such as extreme pressure, high temperature, and the like.

This application is a continuation in part of my copending application Serial No. 637,596, filed October 13, 1932.

The problem of extreme pressure lubrication is becoming of increasing importance with the rapid development of new types of bearings, the use of hypoid gears in motor vehicles, and a general tendency towards greater operating pressures and temperatures. Lubricants of the type contemplated by this invention are also useful in the lubrication of metal-cutting tools, metal-drawing dies, and many types of heavy duty bearings.

This problem is further complicated by the introduction of various types of alloy bearings, many of which are relatively sensitive to corrosion.

It is therefore an object of this invention to provide a lubricating composition which is effective under extreme conditions of temperature and pressure and it is a further object of this invention to provide such a composition which is also relatively stable and non-corrosive, even to alloy bearings which may contain, for instance, a characterizing amount of aluminum, cadmium, copper, tin, lead, silver, nickel or zinc.

Other objects of this invention will appear as the description proceeds.

To the accomplishment of the foregoing and related ends, this invention, then, consists of the means hereinafter fully described and particularly pointed out in the claims.

The following description sets forth in detail certain approved combinations of ingredients embodying my invention, such disclosed means constituting, however, but one of various forms in which the principle of the invention may be used.

Broadly stated, my invention comprises a lubricating composition including a major proportion of lubricating oil and a fluorinated or brominated member of the paraffin series heavier than methane. It is believed that under conditions of extreme pressure the fluorinated or brominated addition agents react chemically or physico-chemically with the metallic surfaces to form a non-fluxing surface which will not seize or score. This invention is not intended to be limited, however, by any particular theory or explanation of the action upon the metallic surfaces.

Of all the halogens fluorine is the most active. It also forms compounds which are more stable and less chemically active than the other halides. For this reason the fluorinated paraffins are particularly preferred for use in lubricants which must be effective in resisting extreme pressures and temperatures and yet not be detrimentally chemically active or decompose under operating conditions, such as are encountered in the lubrication of internal combustion engines, for example. Such a composition also should not have any corrosive action when in storage or idle in the sump. Recent developments in methods of fluorinating organic compounds have made this type of addition agent much more readily available than in the past.

The brominated compounds of the type contemplated by this invention are, on the other hand, particularly suitable for use where rather drastic action is desired, as in the lubrication of wire drawing dies, metal cutting tools, and the like. Such addition agents are not as stable as the corresponding fluorine compounds and hence are not adapted to the same uses but are adapted for general use under conditions of extreme pressure where temperatures are relatively low.

Specific examples illustrating the type of compound suitable as an addition in accordance with my invention are the following:

Hexabrom ethane
Hexafluor ethane
Brominated propane
Fluorinated propane
Brominated butane
Fluorinated butane
Fluorinated hexane
Brominated decane
Fluorinated decane
Brominated mineral oil
Fluorinated mineral oil
Brominated paraffin wax
Fluorinated paraffin wax It is to be understood, of course, that the above examples are intended as illustrative only and not in any way to limit the scope of this invention.

When used in conjunction with a mineral lubricating oil it is obvious that generally only such amounts of the addition agent may be included as are soluble in the specified amount of oil. By the term "soluble" as herein used it is intended to indicate the ability to form not only true solutions but also any form of substantially permanently homogeneous composition when incorporated in mineral oil. With most of the compounds there is usually little difficulty, especially if the incorporation is effected in the manner described in Cornell Patent No. 2,042,880, and since quite small percentages often give remarkably improved results it is seldom of extreme importance that the addition agents be oil-soluble in all proportions. Also, certain compounds are of value as gelling or bodying agents when used in amounts greater than are strictly soluble.

Since, in general, the loss of the addition agent by volatilization will be less for compounds having a low volatility, the vapor pressure of the compounds should, for most purposes, be less than atmospheric pressure at temperatures up to 140° C. It is usually desirable, especially for use in internal combustion engines, that the addition agent will not be evaporated from the lubricant at temperatures below 185° C. In the case of compounds which are stable at temperatures up to their boiling points, the boiling point of the compound should, in general, be higher than 140° C., and for certain uses, such as in internal combustion engines, higher than 185° C.

The base oil employed in the compositions of this invention is usually mineral oil but it is to be understood that any other suitable hydrocarbon lubricating oil, whether naturally occurring or synthetic, and including hydrogenated and volatilized oils, may be employed as the oil base.

It is also within the contemplation of this invention to provide the addition agents in the form of a concentrate in a suitable oil, said oil containing rather high percentages of the addition agents. Such concentrates may be employed for future blending with a lubricating oil in the proportions desired for the particular conditions of use.

The fluorinated and brominated paraffins are generally readily soluble in mineral oils, a characteristic which permits their use in relatively large quantities. As above indicated, the fluorinated paraffins possess the double advantage for certain purposes of being both easily soluble and stable, as well as being very effective.

While mineral oil generally is the principal ingredient of the lubricant, it is not essential that it be the only ingredient other than the addition agent, provided that there be no additional ingredient which is incompatible with such addition agent. It is within the contemplation of this invention to include, if necessary or desirable, such other addition agents as are commonly added to improve the viscosity index or cold test of the lubricant and a lubricating composition according to this invention which also has a separate oiliness increasing agent has been found to be especially effective.

Due to the ready solubility in mineral oil of the compounds of my invention, amounts in the neighborhood of about 10% by weight, based on the amount of oil, may sometimes be employed to advantage, especially if the addition agent is one of the relatively stable fluorinated paraffins. However, for most applications from about 1% to about 10% of the addition agent should prove ample and under certain conditions of use amounts as small as from about 0.1% to about 2% may be sufficient.

Other modes of applying the principle of my invention may be employed instead of the one explained, change being made as regards the materials employed, provided the ingredients stated by any of the following claims or the equivalent of such stated ingredients be employed.

I therefore particularly point out and distinctly claim as my invention:

1. A lubricating composition containing as a principal lubricating constituent a major amount of lubricating oil with the properties of such composition affecting its use as a lubricant improved by incorporating therein from an effective amount to 10%, based on the amount of lubricating oil, of a fluorinated member of the paraffin series heavier than methane having a vapor pressure less than atmospheric at 140° C.

2. A lubricating composition containing as a principal lubricating constituent a major amount of lubricating oil with the properties of such composition affecting its use as a lubricant improved by incorporating therein from about 1% to about 10%, based on the amount of lubricating oil, of a fluorinated member of the paraffin series heavier than methane having a vapor pressure less than atmospheric at 140° C.

3. A lubricating composition containing as a principal lubricating constituent a major amount of lubricating oil with the properties of such composition affecting its use as a lubricant improved by incorporating therein from about 0.1% to about 2%, based on the amount of lubricating oil, of a fluorinated member of the paraffin series heavier than methane having a vapor pressure less than atmospheric at 140° C.

4. A lubricating composition containing as a principal lubricating constituent a major amount of lubricating oil with the properties of such composition affecting its use as a lubricant improved by incorporating therein from an effective amount to 10%, based on the amount of lubricating oil, of a fluorinated member of the paraffin series heavier than methane having a vapor pressure less than atmospheric at 185° C.

5. A lubricating composition containing as a principal lubricating constituent a major amount of lubricating oil with the properties of such composition affecting its use as a lubricant improved by incorporating therein from about 1% to about 10%, based on the amount of lubricating oil, of a fluorinated member of the paraffin series heavier than methane having a vapor pressure less than atmospheric at 185° C.

6. A lubricating composition containing as a principal lubricating constituent a major amount of lubricating oil with the properties of such composition affecting its use as a lubricant improved by incorporating therein from about 0.1% to about 2%, based on the amount of lubricating oil, of a fluorinated member of the paraffin series heavier than methane having a vapor pressure less than atmospheric at 185° C.

7. A lubricating composition containing as a principal lubricating constituent a major amount of lubricating oil with the properties of such composition affecting its use as a lubricant improved by incorporating therein from an effective amount to 10%, based on the amount of lubricating oil, of hexafluor ethane.

8. A lubricating composition containing as a principal lubricating constituent a major amount of lubricating oil with the properties of such composition affecting its use as a lubricant improved by incorporating therein from an effective amount to 10%, based on the amount of lubricating oil, of fluorinated propane having a vapor pressure less than atmospheric at 140° C.

9. A lubricating composition containing as a principal lubricating constituent a major amount of lubricating oil with the properties of such composition affecting its use as a lubricant improved by incorporating therein from an effective amount to 10% based on the amount of lubricating oil, of fluorinated butane having a vapor pressure less than atmospheric at 140° C.

OSCAR L. MAAG.